(12) United States Patent
Critchley et al.

(10) Patent No.: US 7,942,006 B2
(45) Date of Patent: May 17, 2011

(54) COMBUSTORS AND COMBUSTION SYSTEMS FOR GAS TURBINE ENGINES

(75) Inventors: Ian L. Critchley, Phoenix, AZ (US); Frank J. Zupanc, Phoenix, AZ (US)

(73) Assignee: Honeywell International Inc., Morristown, NJ (US)

(*) Notice: Subject to any disclaimer, the term of this patent is extended or adjusted under 35 U.S.C. 154(b) by 1085 days.

(21) Appl. No.: 11/691,337

(22) Filed: Mar. 26, 2007

(65) Prior Publication Data

US 2009/0071161 A1    Mar. 19, 2009

(51) Int. Cl.
*F02C 1/00* (2006.01)
*F02G 3/00* (2006.01)

(52) U.S. Cl. .......................... 60/754; 60/745

(58) Field of Classification Search .............. 60/745, 60/754, 752, 758, 759, 760
See application file for complete search history.

(56) References Cited

U.S. PATENT DOCUMENTS

| | | | |
|---|---|---|---|
| 2,856,755 | A | 10/1958 | Szydlowski |
| 3,204,408 | A | 9/1965 | Vincent |
| 3,263,978 | A | 8/1966 | Safford |
| 3,381,471 | A | 5/1968 | Szydlowski |
| 3,695,037 | A | 10/1972 | Alverani |
| 3,898,797 | A | 8/1975 | Wood |
| 3,916,619 | A | 11/1975 | Masai et al. |
| 3,921,393 | A | 11/1975 | Bracken, Jr. |
| 3,932,988 | A | 1/1976 | Beaufrere |
| 3,983,694 | A | 10/1976 | Bracken, Jr. |
| 4,040,251 | A | 8/1977 | Heitmann et al. |
| 4,232,526 | A | 11/1980 | Barbeau |
| 4,598,544 | A | 7/1986 | Williams et al. |
| 4,769,996 | A | 9/1988 | Barbeau |
| 4,819,424 | A | 4/1989 | Bak |
| 4,870,825 | A | 10/1989 | Chapman |
| 4,996,838 | A | 3/1991 | Melconian |
| 5,165,226 | A | 11/1992 | Newton et al. |
| 5,209,066 | A | 5/1993 | Barbier et al. |
| 5,265,425 | A | 11/1993 | Howell |
| 5,323,602 | A | 6/1994 | Defever |
| RE34,962 | E | 6/1995 | Shekleton et al. |
| 5,775,108 | A | 7/1998 | Ansart et al. |
| 6,164,074 | A | 12/2000 | Madden et al. |
| 6,295,801 | B1 | 10/2001 | Burrus et al. |
| 6,408,629 | B1 | 6/2002 | Harris et al. |
| 6,711,900 | B1 * | 3/2004 | Patel et al. ................. 60/752 |

(Continued)

FOREIGN PATENT DOCUMENTS

WO    0022350 A1    4/2000

(Continued)

*Primary Examiner* — William H Rodríguez
*Assistant Examiner* — Andrew Nguyen
(74) *Attorney, Agent, or Firm* — Ingrassia Fisher & Lorenz, P.C.

(57) ABSTRACT

A combustion system includes a combustor having a forward annular liner having a first plurality of effusion holes, and an aft annular liner having a second plurality of effusion holes and forming a combustion chamber with the forward annular liner. The first plurality of effusion holes and the second plurality of effusion holes are adapted to receive compressed air from a compressor and contribute to a single toroidal recirculation air flow pattern in the combustion chamber. The combustion system further includes a rotary fuel slinger further adapted to receive a flow of fuel from a fuel source and to centrifuge the received fuel into the combustion chamber; and an igniter extending at least partially into the combustion chamber to ignite the fuel and compressed air in the combustion chamber, to thereby generate combusted gas.

15 Claims, 3 Drawing Sheets

U.S. PATENT DOCUMENTS

| | | |
|---|---|---|
| 6,735,949 B1 | 5/2004 | Haynes et al. |
| 6,886,341 B2 | 5/2005 | Inoue et al. |
| 6,955,053 B1 | 10/2005 | Chen et al. |
| 7,036,321 B2 | 5/2006 | Dudebout et al. |
| 7,146,816 B2 | 12/2006 | Anderson et al. |
| 2005/0229601 A1 | 10/2005 | Thompson, Jr. et al. |
| 2006/0037323 A1 | 2/2006 | Reynolds et al. |

FOREIGN PATENT DOCUMENTS

| | | |
|---|---|---|
| WO | 0057048 A2 | 9/2000 |

\* cited by examiner

COMBUSTORS AND COMBUSTION SYSTEMS FOR GAS TURBINE ENGINES

FIELD OF THE INVENTION

The present invention generally relates to combustion systems for gas turbine engines and, more particularly relates to combustion systems for gas turbine engines with effusion cooling and single toroidal recirculation air flow patterns.

BACKGROUND OF THE INVENTION

Many aircraft include one or more auxiliary power units (APUs) to supplement the main propulsion engines in providing electrical and/or pneumatic power. An APU may also be used to start the propulsion engines. An APU is, in most instances, a gas turbine engine that includes a compressor, a combustion system, and a turbine. During operation, the compressor draws in ambient air, compresses it, and supplies the compressed air to the combustion system. The combustion system receives fuel from a fuel source and the compressed air from the compressor, and supplies high energy combusted air to the power turbine, causing it to rotate. The power turbine includes a shaft that may be used to drive a generator for supplying electrical and/or pneumatic power.

However, typical conventional combustion systems present several challenges. First, typical combustion systems with rotary fuel slingers can present challenges with respect to recirculation and flame stability. A combustion system includes a combustor in which the air from the compressor is combusted. In order to establish a stable flame and corresponding high energy combusted air, the combustor utilizes a primary zone. The primary zone is a low-velocity, fuel-rich region in which hot combustion products are recirculated to encourage stable burning of the incoming fuel and air mixture. Conventional combustors may use swirlers to achieve the desired recirculation pattern; however, swirlers cannot be used in a combustor with a rotary fuel slinger that introduces the fuel from the fuel source. Accordingly, conventional combustors with rotary fuel slingers may have difficulty producing the desired level of recirculation and flame stability.

In addition, cooling of conventional combustors of combustion systems can be difficult. Cooling typically is provided for the liners of the combustor because of the high temperatures generated inside the combustor. The temperature generated inside the combustor may reach over 3500° F. while the metals used in combustor construction are limited to 1700-1800° F. Effusion cooling is a widely used technique for protecting the liner walls of the combustor from hot combustion gases. This cooling technique involves providing the combustor wall with a plurality of small holes. A supply of cooling air is passed through the holes from the cooler side of the combustor wall to the side of the combustor wall exposed to higher temperatures. The cooling air actively cools the liner by convection as it passes through the holes and by forming a protective layer of cool air on the hot side after the cooling air is discharged. However, effusion cooling may introduce excessive air that compromises the recirculation pattern and flame stability within the combustor.

Accordingly, it is desirable to provide combustion systems for gas turbine engines with improved flame stability. In addition, it is desirable to provide combustors for gas turbine engines with recirculation air flow patterns that promote flame stability in combustion systems with rotary fuel slingers and effusion cooling. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A combustion system is provided. The combustion system includes a combustor having a forward annular liner having a first plurality of effusion holes, and an aft annular liner having a second plurality of effusion holes and forming a combustion chamber with the forward annular liner. The first plurality of effusion holes and the second plurality of effusion holes are adapted to receive compressed air from a compressor and contribute to a single toroidal recirculation air flow pattern in the combustion chamber. The combustion system further includes a rotary fuel slinger further adapted to receive a flow of fuel from a fuel source and to centrifuge the received fuel into the combustion chamber; and an igniter extending at least partially into the combustion chamber to ignite the fuel and compressed air in the combustion chamber, to thereby generate combusted gas.

A combustor for a combustion system of a gas turbine engine is provided. The combustor includes a forward annular liner having a first plurality of effusion holes; and an aft annular liner having a second plurality of effusion holes and forming a combustion chamber with the forward annular liner. The first plurality of effusion holes and second plurality of effusion holes are adapted to receive compressed air from a compressor and contribute to a single toroidal recirculation air flow pattern in the combustion chamber.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
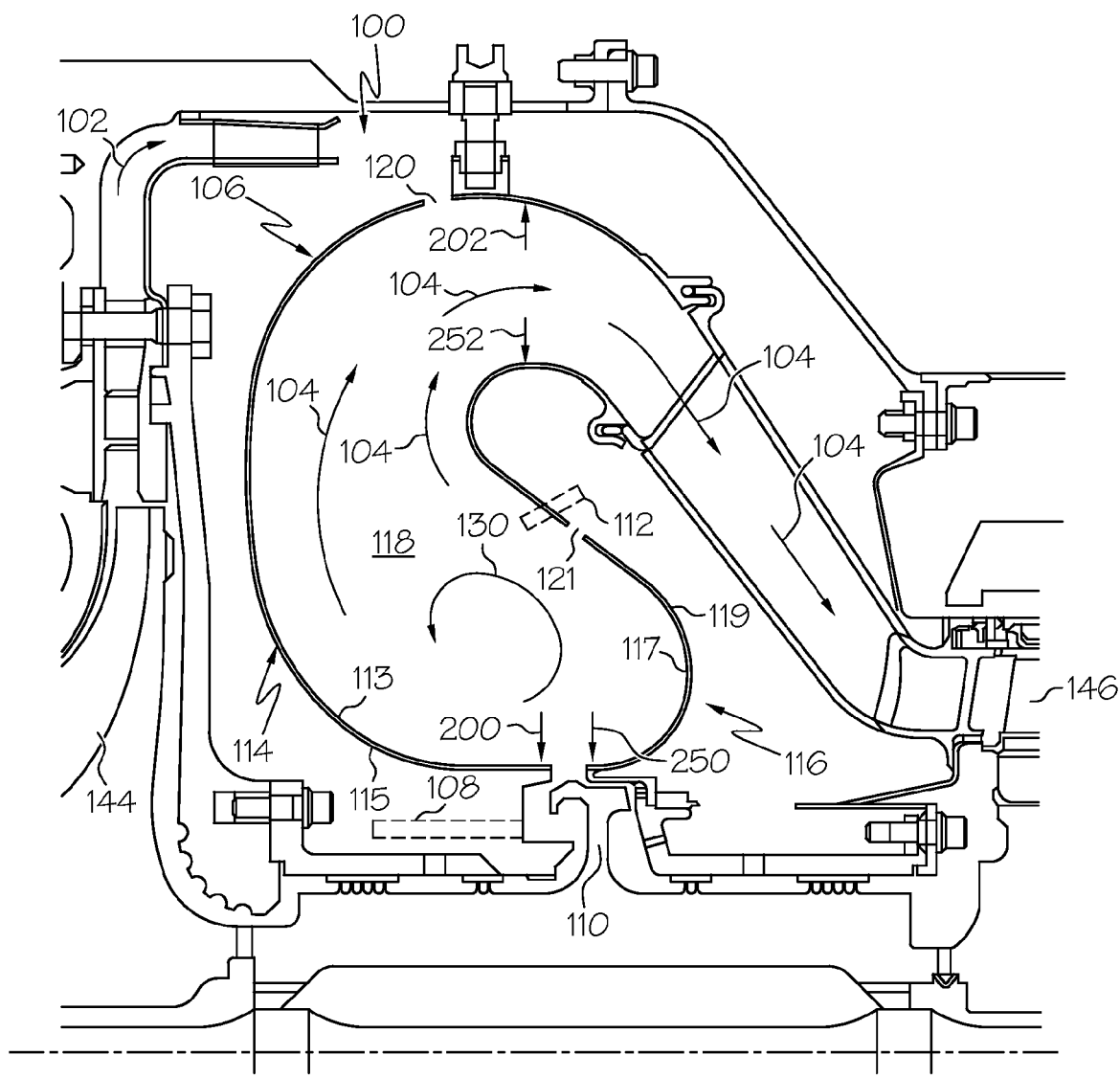
FIG. 1 is a cross-sectional view of a combustion system in accordance with an exemplary embodiment of the present invention.

FIG. 1 illustrates a cross-sectional view of a combustion system 100 in accordance with an exemplary embodiment of the present invention. The combustion system 100 includes a combustor 106, a fuel supply tube 108 illustrated in phantom by dashed lines, a rotary fuel slinger 110, and an igniter 112 also illustrated in phantom by dashed lines. The combustor 106 can be a radial-annular combustor, and include a forward annular liner 114 and an aft annular liner 116. The forward and aft annular liners 114 and 116 are spaced apart from one another and form a combustion chamber 118 therebetween.

During operation, the combustion system 100 receives compressed air 102 from a partially shown compressor 144. The compressed air 102 is received in the combustion system 100 by a plurality of primary air holes 121, a plurality of secondary holes 120 and a plurality of effusion cooling holes (not shown in FIG. 1) in the forward and aft annular liners 114 and 116.

The fuel supply tube 108 is adapted to receive a flow of fuel from the fuel source (not shown) and direct the fuel flow onto the rotary fuel slinger 110. When rotating, the rotary fuel slinger 110 centrifuges the fuel into the combustion chamber 118, where it mixes with the air to create a fuel-air mixture.

The igniter 112 extends through the aft annular liner 116 and partially into the combustion chamber 118. The igniter 112, which may be any one of numerous types of igniters, is adapted to receive energy from an exciter (not shown) in response to the exciter receiving an ignition command from an external source, such as an engine controller (not shown). In response to the ignition command, the igniter 112 generates a spark of suitable energy, which ignites the fuel-air mixture in the combustion chamber 118, and generates a high-energy combusted gas.

As noted above, compressed air 102 from the compressor flows into the combustion chamber 118 via the primary air holes 121, the secondary holes 120 and the effusion holes in both the forward and aft annular liners 114 and 116. As discussed in further detail below with reference to FIGS. 2 and 3, the primary air holes 121, in combination with the effusion holes, create a primary combustion zone with a single toroidal recirculation air flow pattern 130. The single toroidal recirculation air flow pattern 130 results in improved flame and combustion stability. Downstream of the primary combustion zone with the single toroidal recirculation air flow pattern 130, the combusted air is further diluted with air from the secondary air holes 120 and flows, as indicated by arrows 104, towards the turbine 146. The high-energy, combusted air 104 from the combustion system 100 expands through the turbine 146, causing the turbine 146 to rotate. As the turbine 146 rotates, it drives various types of equipment that may be mounted in, or coupled to, an engine (not shown).

Figure 2:
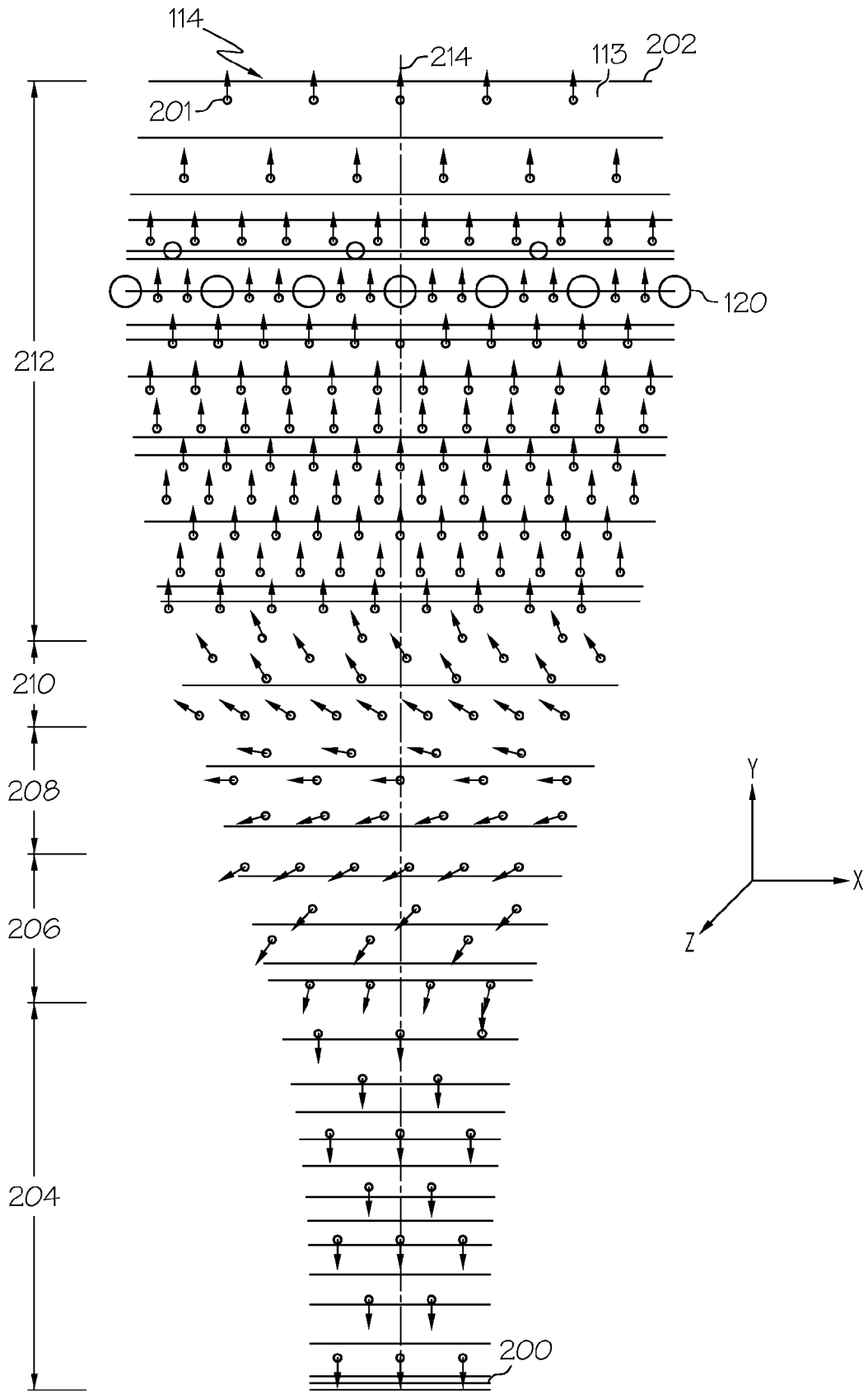
FIG. 2 is a plan view of an inner surface of a portion of a forward annular liner utilized in the combustion system of FIG. 1 that has been flattened for illustrative purposes.
Figure 3:
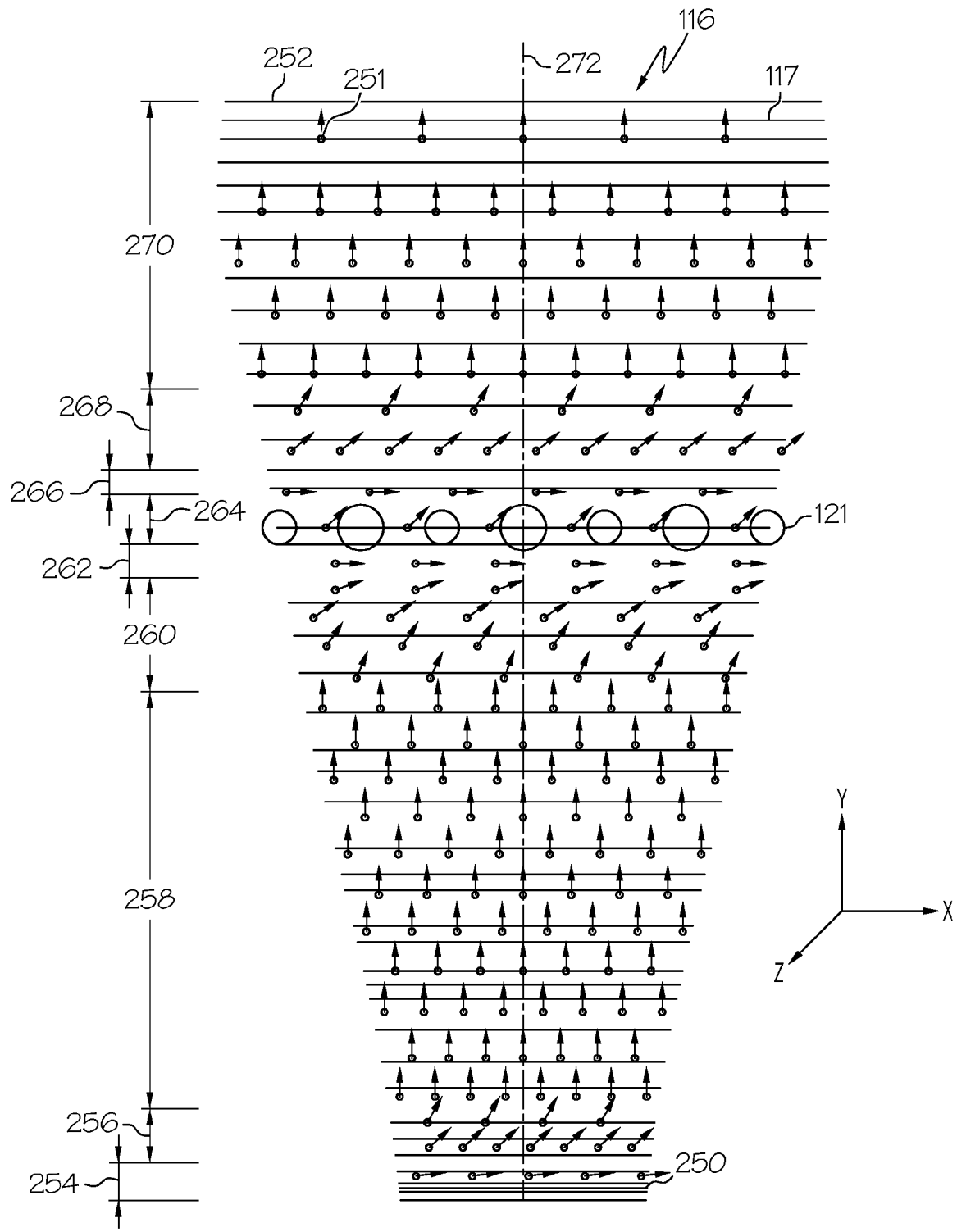
FIG. 3 is a plan view of an inner surface of a portion of an aft annular liner utilized in the combustion system of FIG. 1 that has been flattened for illustrative purposes.

FIG. 2 is a plan view of an inner surface 113 of a portion of the forward annular liner 114 utilized in the combustion system 100 of FIG. 1 that has been flattened for illustrative purposes. In reference to the view of FIG. 1, the forward annular liner 114 in the view of FIG. 2 extends generally from an upstream end 200, near the rotary fuel slinger 110, to a downstream end 202. FIG. 3 is a plan view of an inner surface 117 of a portion of the aft annular liner 116 utilized in the combustion system 100 of FIG. 1 that has been flattened for illustrative purposes. In reference to the view of FIG. 1, the aft annular liner 116 in the view of FIG. 3 extends generally from an upstream end 250, near the rotary fuel slinger 110, to a downstream end 252. Generally, the illustrated portions of the views of FIGS. 2 and 3 correspond to a single igniter 112 (FIG. 1).

The forward annular liner 114 has a plurality of rows of effusion holes 201, and the aft annular liner 116 also has a plurality of rows of effusion holes 251. Orientation of effusion holes with respect to the direction of gas flow in conventional combustors has heretofore been unconcerned with the air flow patterns of the combusted air (e.g., 130 and 104). In contrast, the effusion holes 201 and 251 of the combustor 106 assist in cooling the forward and aft annular liners 114 and 116 and contribute to the toroidal air flow pattern 130 of the air within the combustor 106. The number, diameter, and shape of the effusion holes 201 and 251 may depend on factors such as the dimensions and composition of the liners 114 and 116, and the temperature of the combustion gases. The shape of the individual effusion holes 201 and 251 is generally cylindrical, with minor deviations due to manufacturing method i.e. edge rounding, tapers, out-of-round, elliptical or oblong, etc.

Figure 4:
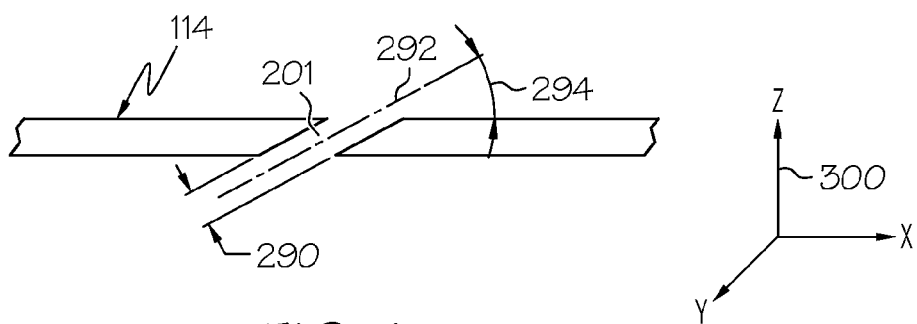
FIG. 4 is a cross-sectional view of an effusion hole utilized in the combustion system of FIG. 1 in accordance with an exemplary embodiment of the present invention.

A cross-sectional view of an exemplary effusion hole 201 in the forward annular liner 114 is illustrated in FIG. 4 along with an x-y-z coordinate system 300. Except for orientation, the effusion holes 251 in the aft annular liner 116 can be identical to the effusion hole 201 depicted in FIG. 4. As described herein, each of the effusion holes 201 and 251 has a z-component extending outwardly from the respective annular liner 114 and 116 and into the combustion chamber 118, and x and y-components within the plane of the respective inner surface 113 and 117 of the annular liners 114 and 116. In the description of FIGS. 2 and 3 below, the x and y-components of the effusion holes 201 and 251 will be described in further detail, although it will appreciated that each of the effusion holes 201 and 251 also has a z-component.

The effusion holes 201 have a diameter 290 within the x-y plane that is preferably in the range of about 0.4 mm to 0.9 mm. The effusion holes 201 are angled such that a longitudinal centerline 292 of the hole forms a 15° to 30° angle 294 with respect to a tangent of the surface 113 of the liner 114 (i.e., the z-axis). The angled orientation of the effusion holes 201 and 251 increases the length of the effusion hole 201 and 251 through the wall of the liner 114 and 116, thus increasing the surface area from which the effusion flow can extract heat from the liner material. The angle also allows the effusion flow to enter the combustion chamber 118 such that a cooling film is generated on the inner surfaces 113 and 117. Moreover, in accordance with an exemplary embodiment of the present invention, the angle enables the design to contribute to the air flow pattern of the air within the combustor chamber 118.

The directions of effusion holes 201 and 251 in the x-y plane of the respective liner 114 and 116 are indicated by the arrows in FIGS. 2 and 3 adjacent the effusion holes 201 and 251. In accordance with an exemplary embodiment of the present invention, the effusion holes 201 and 251 in the forward and aft annular liners 114 and 116 are oriented to direct cooling film flow to control and/or strengthen the air flow from the primary air holes 120 and 121. The resulting arrangement of effusion holes 201 and 251, in combination with the primary air holes 120 and 121, provides the single toroidal recirculation air flow pattern 130 in the combustion chamber 118. This provides richer and more stable combustion conditions. In other words, in addition to providing a cooling function, the effusion holes 201 and 251 contribute to complementary flow patterns (e.g., 104 and 130) in the combustion system 100 that maximize combustion efficiency, materially improve starting dependability, and concomitantly effect effusion cooling of the forward and aft annular liners 114 and 116. This configuration may also eliminate the need for conventional air-guides, typically used in conventional combustors In the illustrated embodiment of FIG. 2, the rows of effusion holes 201 of the forward annular liner 114 are grouped into regions, such as first, second, third, fourth, and fifth regions 204, 206, 208, 210, and 212. In one exemplary embodiment, the effusion holes of the first region 204 can be oriented parallel to a central axis 214 in a y-direction and in the direction of the upstream end 200 and the rotary fuel slinger 110 (FIG. 1). The first region 204 may include about eight rows of equally spaced effusion holes. The effusion holes of the third region 208 can be oriented perpendicular to the effusion holes of the first region and extend primarily in the x-direction. The effusion holes of the third region 208 direct air tangentially to the effusion holes of the first region 204 and the single toroidal recirculation air flow pattern 130 (FIG. 1). The third region 208 may include about three rows of equally spaced effusion holes. The effusion holes of the second region 206 may include effusion holes that are orientated as transitioning between the orientation of the effusion holes of the first region 204 and the orientation of the effusion holes of the third region 208. The second region 206 may include about three rows of equally spaced effusion holes. The effusion holes of the fifth region 212 can be oriented in primarily a y-direction, although in an opposite direction to the orientation of the effusion holes of the first region 204, that is, the effusion holes of the fifth region 212 can be oriented toward the downstream end 202 and the turbine 146 (FIG. 1). The fifth region 212 may include about twelve rows of equally spaced effusion holes. In one embodiment, the primary air holes 120 are adjacent to the effusion holes in the fifth region 212. The effusion holes of the fourth region 210 may include effusion holes that are orientated as transitioning between the effusion holes of the third region 208 and the effusion holes of the fifth region 212. The fourth region 210 may include about four rows of equally spaced effusion holes.

In the illustrated embodiment of FIG. 3, the rows of effusion holes 251 of the aft annular liner 116 are grouped into regions, such as, for example, first, second, third, fourth, fifth, sixth, seventh, eight, and ninth regions 254, 256, 258, 260, 262, 264, 266, 268, and 270. The effusion holes of the first region 254 can be tangential to the single toroidal recirculation air flow pattern 130 (FIG. 1) and generally oriented in an x-direction and perpendicular to a central axis 272 illustrated in FIG. 3. The first region 254 may include about one row of equally spaced effusion holes. The effusion holes of the third region 258 can be oriented in a y-direction, parallel to the central axis 272, and perpendicular to the orientation of the effusion holes of the first region 254 and generally oriented toward the downstream end 252. The third region 258 may include about eleven rows of equally spaced effusion holes. The effusion holes of the second region 256 are oriented as transitioning between the effusion holes of the first region 254 and the effusion holes of the third region 258. The second region 256 may include about two rows of equally spaced effusion holes. The effusion holes of the fifth region 262 can be tangential to the toroidal recalculation pattern (FIG. 1) and generally oriented in an x-direction, perpendicular to the orientation of the effusion holes of the third region 258. The fifth region 262 may include about one row of equally spaced effusion holes. The effusion holes of the fourth region 260 can be oriented as transitioning between the effusion holes of the third region 258 and the effusion holes of the fifth region 262. The fourth region 260 may include about four rows of equally spaced effusion holes. The effusion holes of the sixth region 264 in the aft annular liner can be generally oriented at an angle from the x-axis. The sixth region 264 may include about one row of equally spaced effusion holes. In one embodiment, the row of primary air holes 121 (FIG. 1) is adjacent the sixth region 264 of effusion holes. The effusion holes of the seventh region 266 can be tangential to the toroidal recirculation and include effusion holes oriented generally in the x-direction. The seventh region 266 may include about one row of equally spaced effusion holes. The effusion holes of the ninth region 270 direct air towards the downstream end 252 and the turbine 146 and are generally oriented in the y-direction of FIG. 3. The ninth region 270 may include about five rows of equally spaced effusion holes. The effusion holes of the eighth region 268 can be oriented as transitioning between the effusion holes of the seventh region 266 and effusion holes of the ninth region 270. The eighth region 268 may include about two rows of equally spaced effusion holes.

As noted above, the effusion holes 201 of the forward annular liner 114 and the effusion holes 251 of the aft annular liner 116 contribute to the creation of the single toroidal recirculation air flow pattern 130. The primary air holes 121 may also contribute to the single toroidal recirculation air flow pattern 130. As illustrated in FIGS. 2 and 3, the effusion holes of the first region 204 of the forward annular liner 114 and the effusion holes of the third region 258 of the aft annular liner 116 oppose one another in direction and on opposite sides of the combustion chamber 118 to create the toroidal effect. Thus, the effusion holes of the first region 204 of the forward annular liner 114 direct air upstream, and the effusion holes of the third region 258 of the aft annular liner 116 direct air downstream. The primary air holes 121 of the aft annular liner 116 direct the air from the aft annular liner 116, across the combustion chamber 118, and in the direction of the forward annular liner 114 to be entrained by the radially inward direction of the effusion holes of the first region 204 to also form part of the single toroidal recirculation air flow pattern 130.

The effusion holes of the third region 208 in the forward annular liner 114 perform a cooling function by directing air tangential to the single toroidal recirculation air flow pattern 130 in an annular direction, in effect, to spread out the single toroidal recirculation air flow pattern 130 in an annular direction. Otherwise, the forward annular liner 114 at the position of the third region 208 may become unacceptably hot since this position is generally opposite the primary air holes 121 of the aft annular liner 116. The effusion holes of the first region 254 of the aft annular liner 116 are also positioned tangential to the single toroidal recirculation air flow pattern 130 in an annular direction, in effect, to spread out the single toroidal recirculation air flow pattern 130 in the annular direction. The effusion holes of the fifth, sixth, and seventh regions 262, 264, and 266 of annular liner 116 are also positioned in a generally tangential direction to the single toroidal recirculation air flow pattern 130 in the area of the primary air holes 121. The effusion holes in these regions 262, 264, and 266 also serve to spread out the single toroidal recirculation air flow pattern 130 in the annular direction. The effusion holes in these regions 262, 264, and 266 additionally provide cooling air to mitigate the heat of the aft annular liner 116 resulting from a hot wake region adjacent the primary air holes 121. The effusion holes of the fifth region 212 of the forward annular liner 114 and the effusion holes of the ninth region 270 of the aft annular liner 116 direct the combusted air downstream towards the outlet of the combustion chamber 118 and the turbine 146. The second and fourth regions 206 and 210 in the forward annular liner 114 and the second, fourth, and eighth regions 256, 260, and 268 in the aft annular liner 116 are transition regions that assist in creating smooth flow patterns.

As noted above, the arrangement and number of the effusion holes 201 and 251 may vary with application and may depend on factors including the dimensions of the combustion system 100, the composition of the combustor liners 114 and 116, the velocity of the cooling air, and the temperature of the combustion gases. Computational fluid dynamic (CFD) analysis may be useful in determining the desired number of rows and array configuration for a particular application. The effusion holes 201 and 251 may be formed by conventional drilling techniques such as electrical-discharge machining (EDM), stationary percussion laser machining and percussion on-the-fly laser drilling, or with complex casting techniques.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A combustion system, comprising:
    a combustor having
        a forward annular liner having a first plurality of effusion holes, and
        an aft annular liner having a second plurality of effusion holes and forming a combustion chamber with the forward annular liner,
        wherein the first plurality of effusion holes and the second plurality of effusion holes are adapted to receive compressed air from a compressor and contribute to a single toroidal recirculation air flow pattern in the combustion chamber;
    a rotary fuel slinger further adapted to receive a flow of fuel from a fuel source and to centrifuge the received fuel into the combustion chamber; and
    an igniter extending at least partially into the combustion chamber to ignite the fuel and compressed air in the combustion chamber, to thereby generate combusted gas,
    wherein the first plurality of effusion holes of the forward annular liner includes a first region of effusion holes, and the second plurality of effusion holes of the aft annular liner includes a second region of effusion holes, and wherein the effusion holes of the first region are oriented in a first direction and the effusion holes of the second region are oriented in a second direction, wherein the first direction is opposite from the second direction,
    wherein the aft annular liner further includes a first plurality of primary air holes downstream of the second region of effusion holes.

2. The combustion system of claim 1, wherein the combustor is in fluid communication with a turbine of an auxiliary power unit.

3. The combustion system of claim 1, wherein the aft annular liner includes a third region of effusion holes oriented in an approximately perpendicular direction to the second direction, the third region of effusion holes being positioned between the second region of effusion holes and the rotary fuel slinger.

4. The combustion system of claim 3, wherein the first plurality of effusion holes of the forward annular liner includes a fourth region of effusion holes radially opposing the first plurality of primary air holes and oriented in a third direction, generally tangential and perpendicular to the single toroidal recirculation air flow pattern.

5. The combustion system of claim 3, wherein the first plurality of effusion holes of the forward annular liner includes a fourth region of effusion holes oriented in a third direction tangential to the single toroidal recirculation air flow pattern.

6. The combustion system of claim 4, wherein the fourth region of effusion holes is downstream of the first region of effusion holes.

7. The combustion system of claim 1, wherein the first and second pluralities of effusion holes are adapted to cool the forward and aft annular liners.

8. A combustor for a combustion system of a gas turbine engine, comprising:
    a forward annular liner having a first plurality of effusion holes; and
    an aft annular liner having a second plurality of effusion holes and forming a combustion chamber with the forward annular liner,
    wherein the first plurality of effusion holes and second plurality of effusion holes are adapted to receive compressed air from a compressor and contribute to a single toroidal recirculation air flow pattern in the combustion chamber,
    wherein the first plurality of effusion holes of the forward annular liner includes a first region of effusion holes, and the second plurality of effusion holes of the aft annular liner includes a second region of effusion holes, and wherein the effusion holes of the first region are oriented in a first direction and the effusion holes of the second region are oriented in a second direction, wherein the first direction is opposite from the second direction,
    wherein the first plurality of effusion holes of the forward annular liner includes a third region of effusion holes oriented in a third direction tangential to the single toroidal recirculation air flow pattern.

9. The combustor of claim 8, wherein the third region of effusion holes are oriented in an approximately perpendicular direction to the second direction, the third region of effusion holes being positioned between the second region of effusion holes and a fuel flow.

10. The combustor of claim 8, wherein the third region of effusion holes is downstream of the first region of effusion holes.

11. The combustor of claim 8, wherein the aft annular liner further includes a first plurality of primary air holes downstream of the second region of effusion holes.

12. The combustor of claim 8, wherein the aft annular liner further includes a first plurality of primary air holes downstream of the second region of effusion holes, and wherein the first plurality of effusion holes of the forward annular liner includes a fourth region of effusion holes radially opposing the first plurality of primary air holes and oriented in a third direction, generally tangential and perpendicular to the single toroidal recirculation air flow pattern.

13. The combustor of claim 8, wherein the first and second pluralities of effusion holes are adapted to cool the forward and aft annular liners.

14. A combustor for a combustion system of a gas turbine engine, comprising:
    a forward annular liner having a first plurality of effusion holes; and
    an aft annular liner having a second plurality of effusion holes and a plurality of primary air holes, the aft and forward liners forming a combustion chamber,
    wherein the first plurality of effusion holes, the second plurality of effusion holes, and the plurality of air holes are adapted to receive compressed air from a compressor and contribute to a single toroidal recirculation air flow pattern in the combustion chamber, wherein the first plurality of effusion holes includes
a first region of effusion holes oriented in a first direction, the first direction being parallel to a longitudinal axis of the forward annular liner and in an upstream direction,
a second region of effusion holes positioned downstream of the first region of air effusion holes and oriented in a second direction, perpendicular to the first direction, and
a third region of effusion holes positioned downstream of the second region of effusion holes and oriented in a third direction, the third direction being parallel to the longitudinal axis of the forward annular liner and in a downstream direction, and
wherein the forward annular liner defines a first plurality of primary holes generally circumferentially aligned with the third region of effusion holes.

15. The combustor of claim 14, wherein the second plurality of effusion holes includes a fourth region of effusion holes oriented in a fourth direction, the fourth direction being generally perpendicular to a longitudinal axis of the aft annular liner,
a fifth region of effusion holes downstream of the fourth region of effusion holes and oriented in a fifth direction, the fifth direction being parallel to the longitudinal axis of the aft annular liner and in the downstream direction,
a sixth region of effusion holes downstream of the fifth region of effusion holes and oriented in the fourth direction, and
a seventh region of effusion holes downstream of the sixth region of effusion holes and oriented in the downstream direction, and
wherein the aft annular liner defines a second plurality of primary holes generally circumferentially aligned with the sixth region of effusion holes and radially opposed to the second region of effusion holes.

\* \* \* \* \*